(12) United States Patent
Hill

(10) Patent No.: US 8,505,973 B2
(45) Date of Patent: Aug. 13, 2013

(54) FORWARD MOUNT

(76) Inventor: Curt J. Hill, Warba, MN (US)

( * ) Notice: Subject to any disclaimer, the term of this patent is extended or adjusted under 35 U.S.C. 154(b) by 104 days.

(21) Appl. No.: 13/136,298

(22) Filed: Jul. 28, 2011

(65) Prior Publication Data

US 2013/0026745 A1 Jan. 31, 2013

(51) Int. Cl.
| | | |
|---|---|---|
| A01B 51/00 | (2006.01) | |
| A01B 59/06 | (2006.01) | |
| A01B 63/02 | (2006.01) | |
| B62D 21/00 | (2006.01) | |
| E01H 5/04 | (2006.01) | |

(52) U.S. Cl.
USPC ............. 280/781; 37/231; 172/272; 172/308; 172/810; 172/817; 180/908; 414/686

(58) Field of Classification Search
USPC ................... 37/231, 232; 172/272, 297, 308; 172/677, 810, 817; 180/311, 908; 224/401, 224/410, 488, 495, 502; 280/479.2, 479.3, 280/493, 494, 515, 656, 781, 789; 296/203.01, 296/204, 205; 403/109.1, 118, 119; 414/685, 414/686, 718
See application file for complete search history.

(56) References Cited

U.S. PATENT DOCUMENTS

| | | | |
|---|---|---|---|
| 2,630,232 A * | 3/1953 | Silver et al. ................. | 414/703 |
| 2,862,315 A * | 12/1958 | Blanchet ..................... | 172/817 |
| 3,388,929 A * | 6/1968 | Miley ......................... | 280/481 |
| 3,773,116 A * | 11/1973 | Coontz ....................... | 172/817 |
| 3,792,876 A * | 2/1974 | Norman ..................... | 280/416.1 |
| 5,088,215 A * | 2/1992 | Ciula ......................... | 37/197 |
| 6,334,269 B1 * | 1/2002 | Dilks ......................... | 37/235 |
| RE37,628 E * | 4/2002 | Segorski et al. ............ | 37/231 |
| 6,729,431 B2 * | 5/2004 | Osuga et al. ............... | 180/312 |
| 6,732,811 B1 * | 5/2004 | Elliott ........................ | 172/445.1 |
| 6,843,002 B1 * | 1/2005 | Moffitt ....................... | 37/231 |
| 6,964,121 B2 * | 11/2005 | Harris ........................ | 37/231 |
| 7,093,380 B2 * | 8/2006 | Hubscher et al. .......... | 37/231 |
| 7,103,995 B2 * | 9/2006 | Curtis ........................ | 37/231 |
| 7,302,765 B1 * | 12/2007 | Jorgenson et al. ......... | 37/231 |
| 7,472,499 B2 * | 1/2009 | Schmeichel ............... | 37/232 |
| 7,926,830 B2 * | 4/2011 | Hill ............................ | 280/416.1 |
| 8,322,581 B2 * | 12/2012 | Hill ............................ | 224/401 |
| 8,381,422 B2 * | 2/2013 | Hill ............................ | 37/231 |
| 2007/0101620 A1 * | 5/2007 | Roy ........................... | 37/232 |
| 2007/0187118 A1 * | 8/2007 | Belanger .................... | 172/1 |
| 2008/0172913 A1 * | 7/2008 | Bailey et al. .............. | 37/468 |
| 2008/0202779 A1 * | 8/2008 | Uchijima et al. .......... | 172/272 |
| 2010/0164202 A1 * | 7/2010 | Dilworth et al. ........... | 280/477 |
| 2012/0121321 A1 * | 5/2012 | Hill ............................ | 403/287 |
| 2012/0121323 A1 * | 5/2012 | Hill ............................ | 403/321 |
| 2012/0267133 A1 * | 10/2012 | Hill ............................ | 172/701.1 |

* cited by examiner

*Primary Examiner* — Joseph Rocca
*Assistant Examiner* — Laura Freedman
(74) *Attorney, Agent, or Firm* — Dennis L. Thotme; Thomte Patent Law Office LLC

(57) ABSTRACT

A forward mount is disclosed which is secured to the frame of an off-road vehicle to enable the rearward ends of a push-tube assembly to be secured thereto. The forward mount of this invention may be attached to the main frame of off-road vehicles of different manufacturers in various ways.

11 Claims, 11 Drawing Sheets

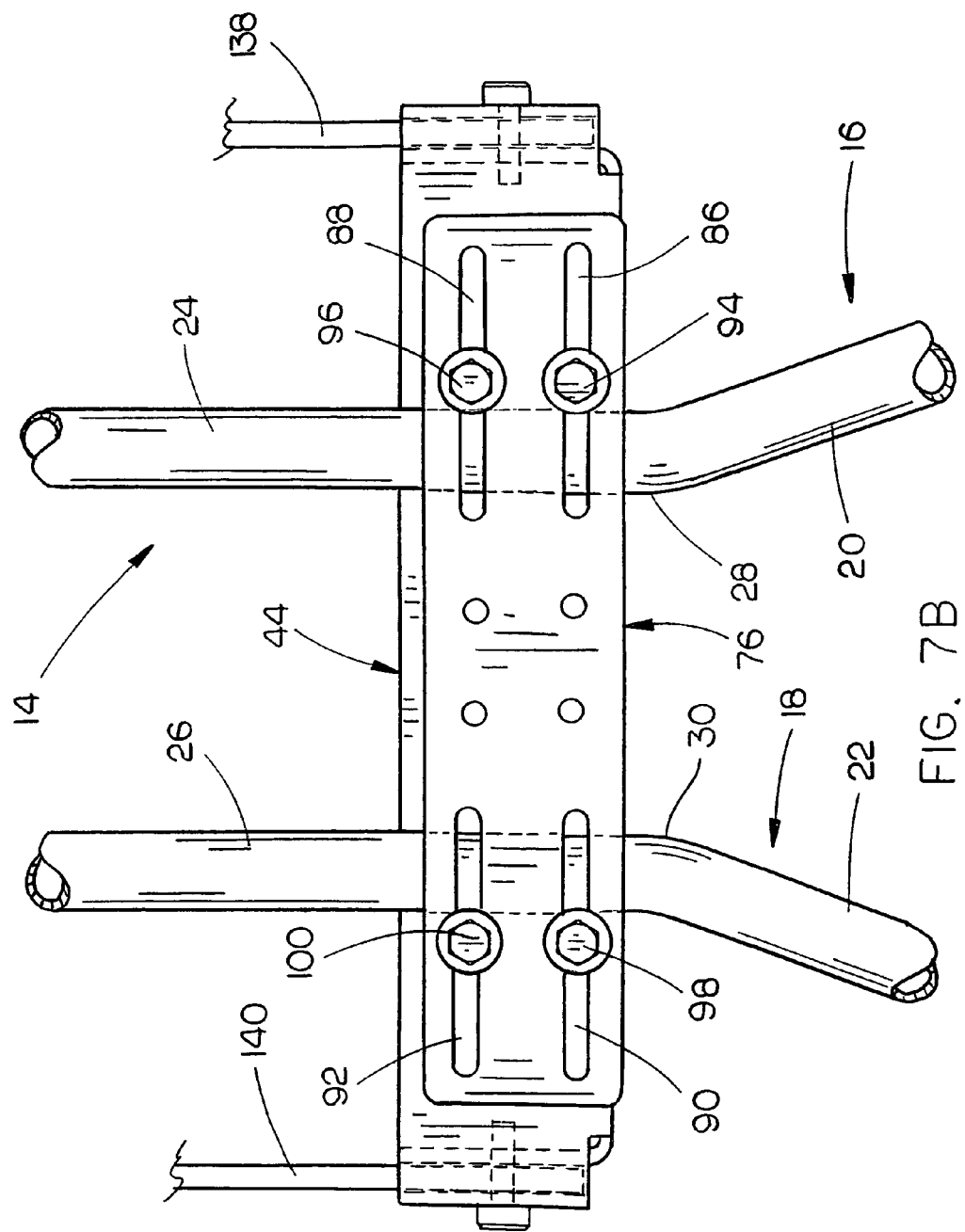

FORWARD MOUNT

BACKGROUND OF THE INVENTION

1. Field of the Invention

This invention relates to a mount for pivotally securing the rearward end of a push tube assembly to the frame of an off-road vehicle such as an ATV or UTV. More particularly this invention relates to a forward mount which may be secured to the frame of an ATV or UTV of different manufacturers.

2. Description of the Related Art

In recent years, it has become common to mount an implement such as a plow blade, mower or rotary sweeper on the forward end of an off-road vehicle such as an ATV or UTV. A vast majority of the ATV's and UTV's manufactured by different companies include a main frame at the underside of the vehicle. Most main frames include first and second elongated, tubular frame members. Each of the first and second frame members have a longitudinally extending rear portion, an intermediate portion which extends inwardly and forwardly from the forward end of the rear portion, and a front portion which extends forwardly from the forward end of the intermediate portion. In many cases, a vertically extending frame member extends upwardly from the frame member adjacent the juncture of the intermediate portion and the front portion thereof.

Many manufacturers secure the rearward end of a push tube assembly to the main frame by means of a mount secured to the underside of the vehicle midway between the forward and rearward ends of the vehicle. The fact that the rearward ends of the push tube assembly are secured to the vehicle at the mid-point thereof limit the vertical movement of the implement secured to the forward end of the push tube assembly. A further problem with the conventional mounts is that they may move rearwardly with respect to the vehicle should the implement on the forward end of the push tube assembly strike an obstruction such as a curb, tree, etc.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A forward mount is disclosed for use with an off-road vehicle having a forward end, a rearward end, a first side, a second side, and an underside. The vehicle includes a main frame having a portion thereof exposed at the underside thereof. The main frame includes a first longitudinally extending frame member having a generally longitudinally extending rear frame portion with forward and rearward ends, an intermediate frame portion having rearward and forward ends which extends horizontally forwardly and inwardly from the forward end of the rear frame portion, and a generally longitudinally extending front frame portion, with rearward and forward ends, which extends forwardly from the forward end of the intermediate frame portion.

The main frame also includes a second longitudinally extending frame member having a generally longitudinally extending rear frame portion, with forward and rearward ends, an intermediate frame portion, having rearward and forward ends, which extends horizontally forwardly and inwardly from the forward end of the rear frame portion, and a generally longitudinally extending front frame portion, with rearward and forward ends, which extends forwardly from the forward end of the intermediate frame portion.

The rear frame portions of the first and second frame members are generally parallel to one another. The front frame portions of the first and second frame members are also generally parallel to one another.

An elongated and transversely extending forward mount weldment, having first and second ends, is selectively detachably secured to the first and second frame members and extends therebetween adjacent the juncture of the front end intermediate frame portions of the main frame. The forward mount weldment has a push tube mount at each of its ends for pivotally receiving the rearward ends of the push tubes of a push tube assembly.

The forward mount weldment includes a generally horizontally disposed mounting plate having a plurality of spaced-apart slots formed therein.

The forward mount may be selectively secured to the first and second frame members by means of U-bolts which extend around the first and second frame members and through the slots in the mounting plate of the forward mount weldment. The slots in the mounting plate of the forward mount weldment permit the attachment of the forward mount weldment to be mounted on frame members of vehicles of different manufacturers. The forward mount may also have a top plate positioned above the forward mount weldment with the top plate and forward mount weldment being clamped onto the frame members by means of bolts having spacers thereon. Other ways of securing the forward mount to the vehicle are also disclosed.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 7B is a view similar to FIG. 7A except that the forward mount has been secured to the frame members of the frame of the off-road vehicle forwardly of that shown in FIG. 7A;

DESCRIPTION OF THE PREFERRED EMBODIMENT

Figure 1:
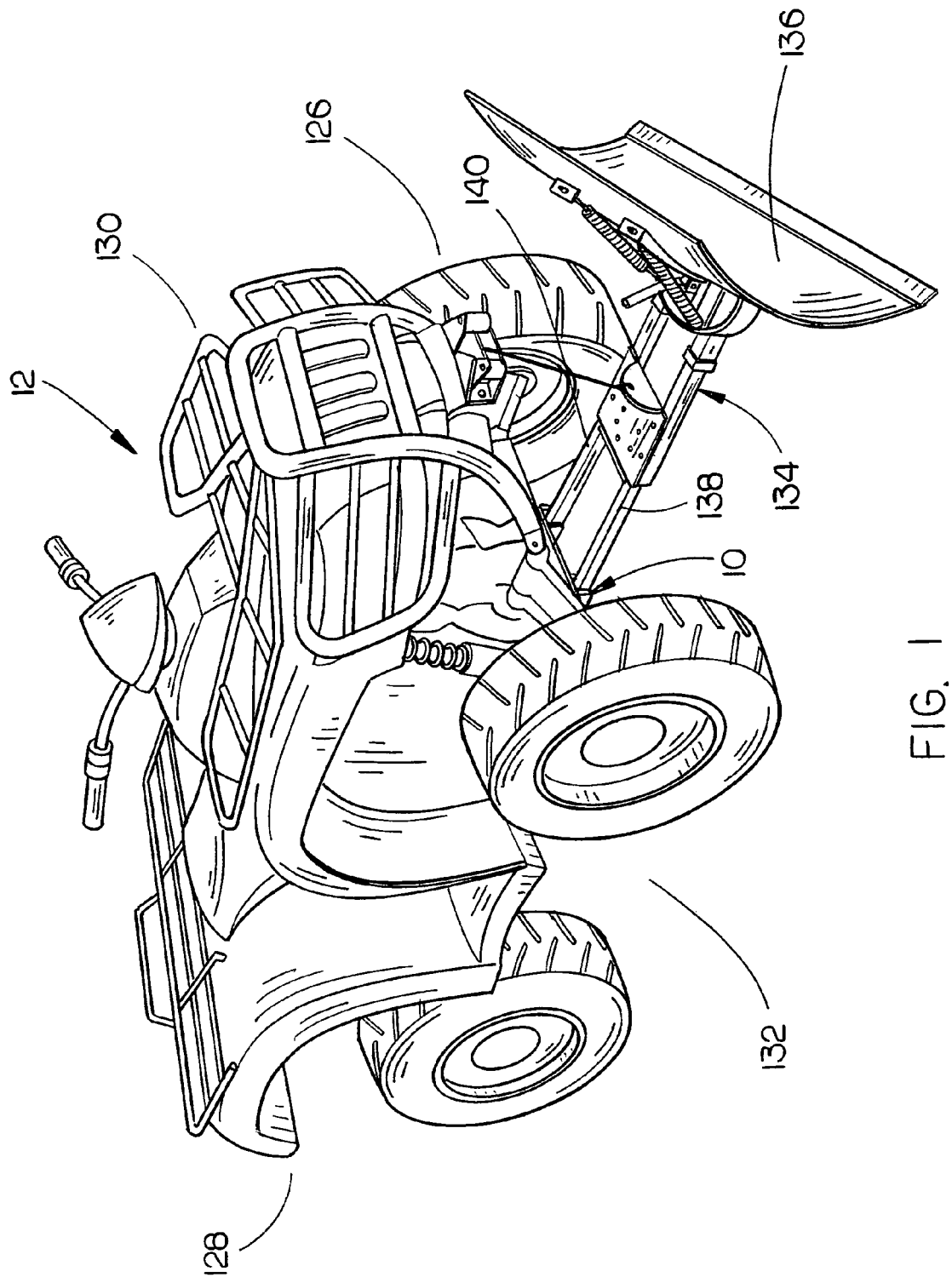
FIG. 1 is a front perspective view of an off-road vehicle such as an ATV having the forward mount of this invention mounted thereon.
Figure 2:
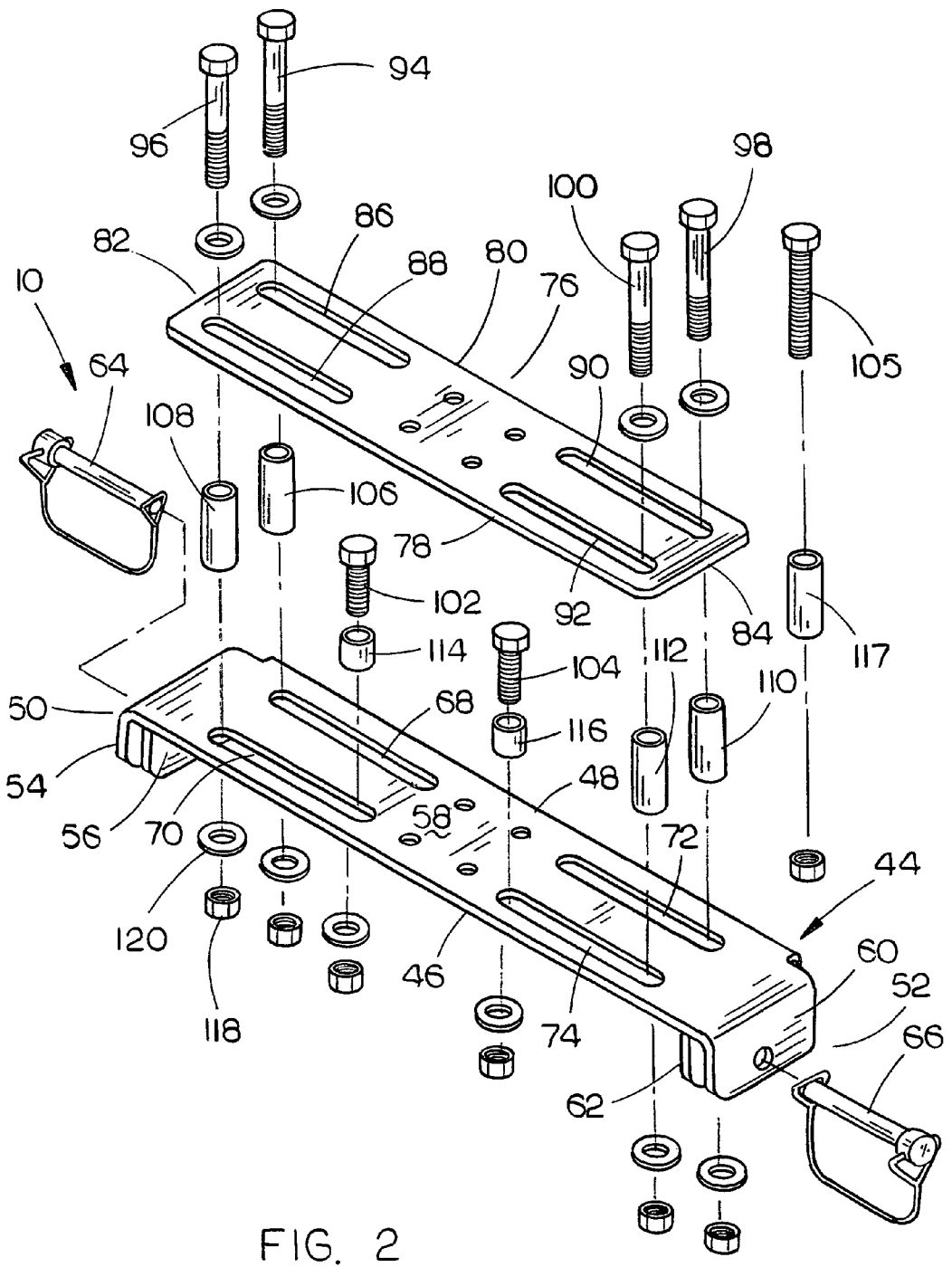
FIG. 2 is a front exploded perspective view of the forward mount of this invention.
Figure 3:
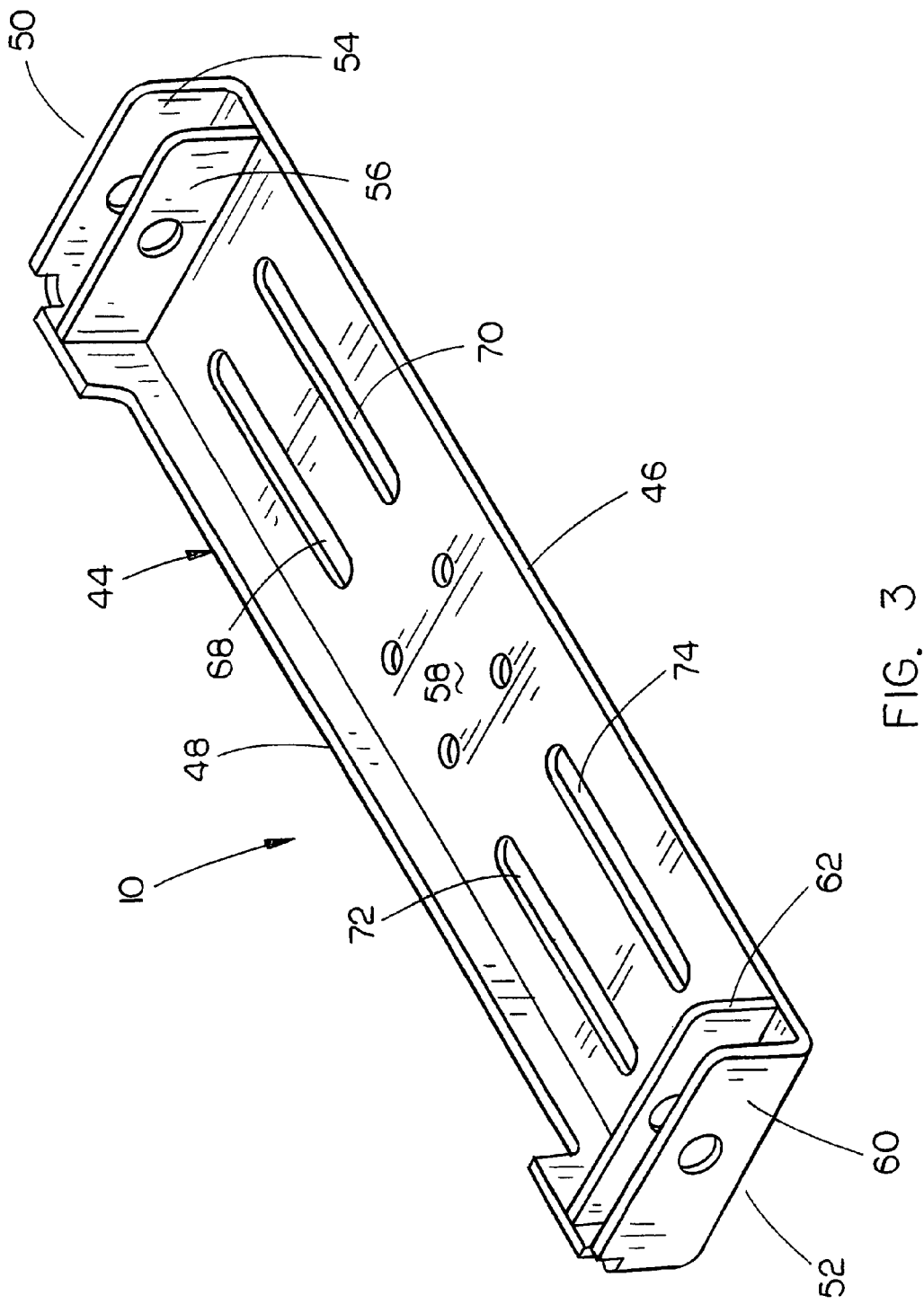
FIG. 3 is a bottom perspective view of the forward mount weldment portion of the forward mount of this invention.
Figure 4:
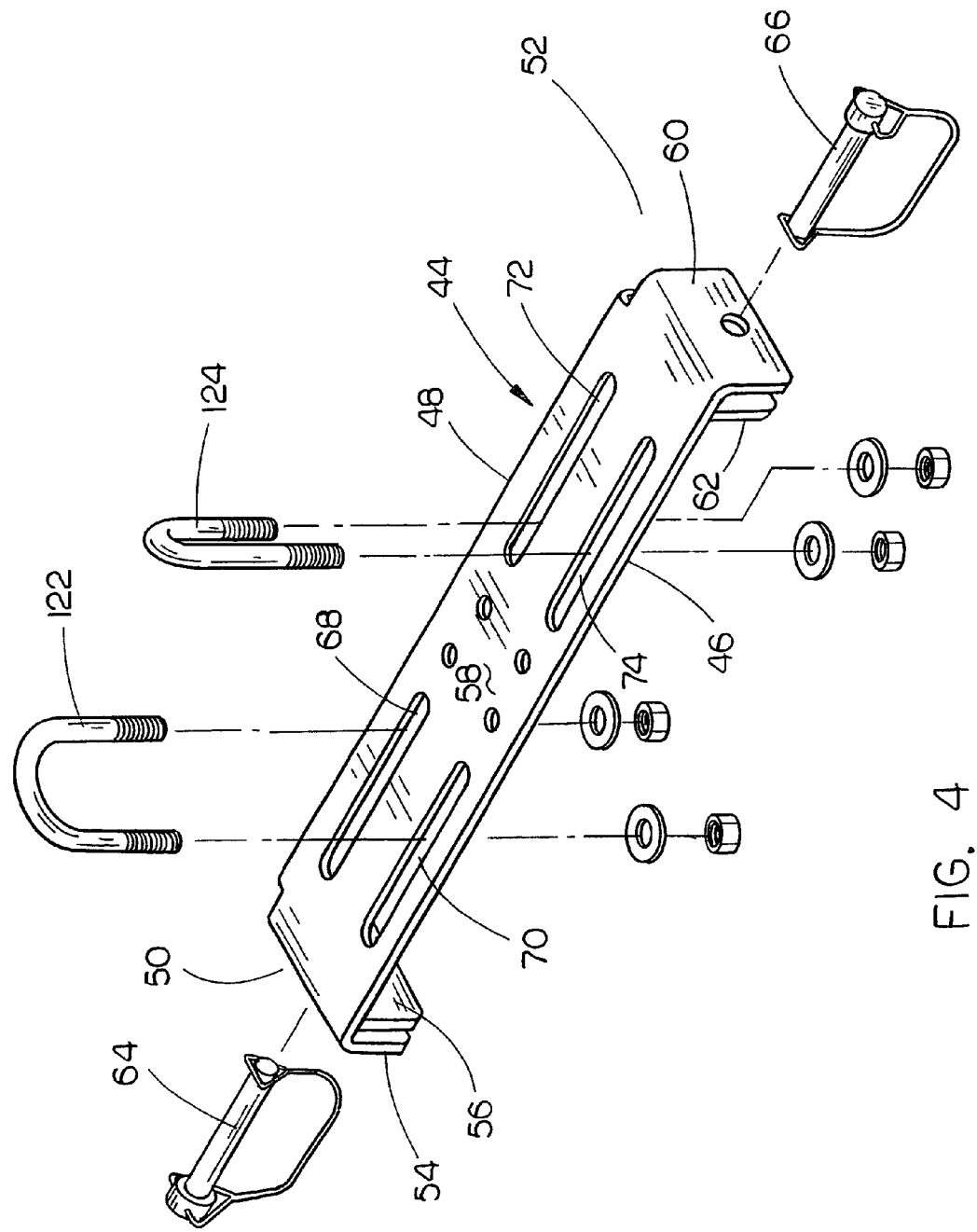
FIG. 4 is a front exploded perspective view of the forward mount weldment illustrating the manner in which U-bolts may be associated therewith.
Figure 5:
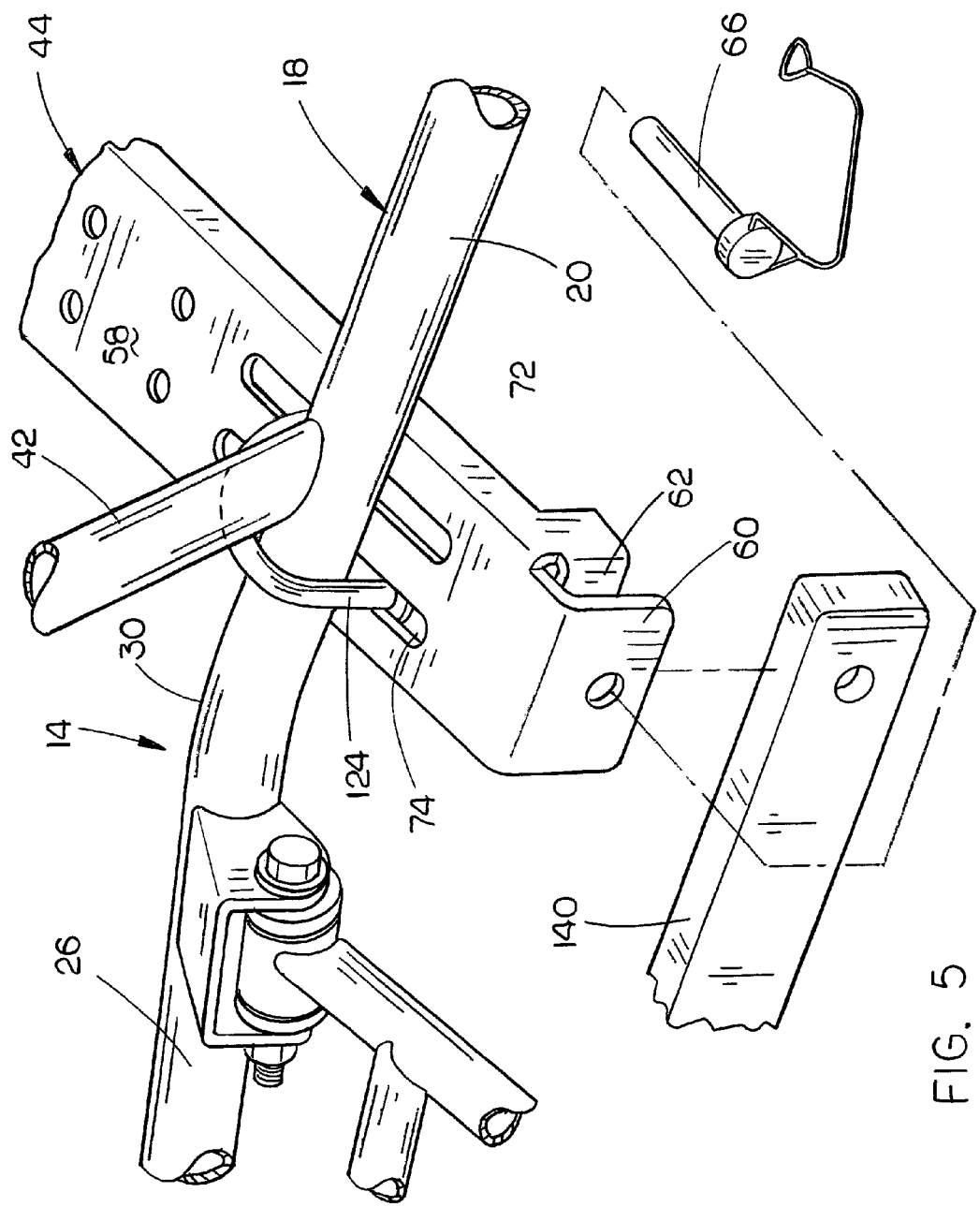
FIG. 5 is a partial perspective view illustrating the manner in which one end of the forward mount weldment may be attached to the frame of the off-road vehicle.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The forward mount of this invention is referred to by the reference numeral 10 while the numeral 12 refers to an off-road vehicle such as an all-terrain vehicle (ATV). Most ATV's include a main frame 14 which normally include a pair of tubular frame members 16 and 18 which extend between the forward and rearward ends of the ATV. The frame members 16 and 18 usually have inwardly and forwardly extending frame portions 20 and 22 respectively to accommodate suspension systems at the forward end of the ATV. The frame portions 20 and 22 terminate in generally straight and forwardly extending frame portions 24 and 26 respectively. The juncture of frame portions 20 and 24 is designated by the reference numeral 28 while the juncture of frame portions 22 and 26 is designated by the reference numeral 30. In some cases, the underside of the ATV will have a skid plate positioned below the frame members 20 and 22 and the frame portions 24 and 26 which makes it difficult to gain access to the frame portions 20 and 22 and the frame portions 24 and 26. In other cases, the underside of the ATV will have a pair of spaced-apart mounts 34 which extend horizontally laterally from opposite sides of frame member 38. In many cases, when the tubular frame members 16 and 18 form a part of the frame of the ATV, a generally vertically extending frame member 40 extends upwardly from frame member 16 adjacent juncture 28 and a generally vertically extending frame member 42 extends upwardly from frame member 18 adjacent juncture 30.

Forward mount 10 includes a forward mount weldment 44 having a forward end 46, rearward end 48, a first end 50 and a second end 52. A pair of horizontally spaced-apart plates 54 and 56 extend downwardly from one end of the horizontally disposed mounting plate 58 of weldment 44 and a pair of horizontally spaced-apart plates 60 and 62 extend downwardly from the other end of mounting plate 58 of weldment 44. Each of the plates 54 and 56 has a pin opening formed adapted to receive a lock pin 64 extending therethrough. Each of the plates 60 and 62 has a pin opening formed therein adapted to receive a lock pin 66 therein. Mounting plate 58 of forward mount weldment 44 includes elongated and transversely extending slots 68, 70, 72 and 74 formed therein as seen in the drawings. Forward mount 10 also includes a top plate 76, which is not always used, having a forward end 78, a rearward end 80, a first end 82 and a second end 84. Top plate 76 has transversely extending slots 86, 88, 90 and 92 formed therein as seen in the drawings. The numerals 94, 96, 98, 100, 102, 104 and 105 refer to bolts while the numerals 106, 108, 110, 112, 114, 116, 117 refer to tubular spacers. The forward mount 10 also includes nuts 118 and washers 120. Further, forward mount 10 includes U-bolts 122 and 124.

FIG. 1 illustrates a conventional ATV 12, which has a forward end 126, a rearward end 128, a left side 130 and a right side 132. The main frame 14 forms a part of the ATV 12 at the underside thereof as set forth above. ATV 12 includes a push tube assembly 134 having an implement such as a blade 136 secured to the forward end thereof. Push tube assembly 134 includes push tubes 138 and 140. The rearward ends of push tubes 138 and 140 will be pivotally secured, about horizontal axes, to forward mount 10 as will be explained hereinafter.

Figure 6:
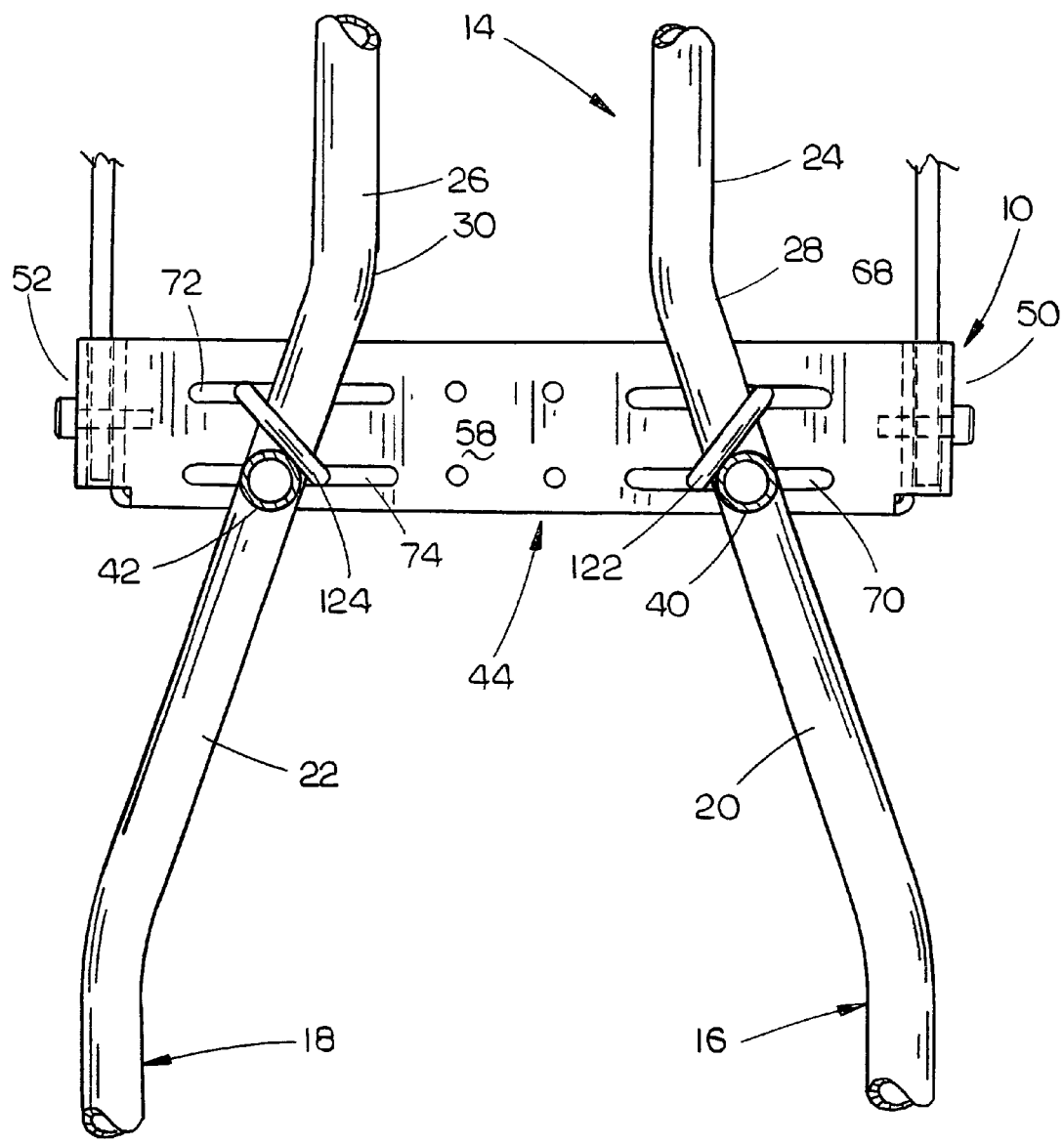
FIG. 6 is a top elevational view illustrating the manner in which the forward mount weldment may be attached to the frame members of the frame of the off-road vehicle.

The forward mount 10 may be secured to the underside of the ATV 12 in a number of different ways. In one method, as seen in FIG. 6, top plate 76 is not used and the forward mount weldment 44 is positioned below the frame members 16 and 18 rearwardly of the junctures 28 and 30 respectively. The U-bolts 122 and 124 are extended over the frame members 16 and 18 closely adjacent the vertically extending frame members 40 and 42 respectively and forwardly thereof. The legs of U-bolt 122 are extended downwardly through slots 68 and 70 in plate 58. Washers are slipped onto the protruding legs and nuts are then threaded onto the legs of the U-bolt 122. The legs of U-bolt 124 are extended downwardly through slots 72 and 74 in plate 58.

Washers are slipped onto the protruding legs and nuts are then threaded onto the legs of the U-bolt 122. The legs of U-bolt 124 are extended downwardly through slots 72 and 74 in plate 58. Washers are slipped onto the protruding legs and nuts are then threaded onto the legs of the U-bolt 124. The U-bolts 122 and 124 securely hold the forward mount weldment 44 in place. The engagement of the U-bolts 122 and 124 with the frame members 40 and 42 prevents rearward movement of the forward mount weldment 44 with respect to the frame 14 should the blade 136 or other implement strike an object such as a curb, obstruction or the like. The fact that the U-bolts 122 and 124 are positioned forwardly of the frame members 40 and 42 respectively also prevents rearward movement of forward mount weldment 44 should the implement strike an obstruction.

Figure 7:
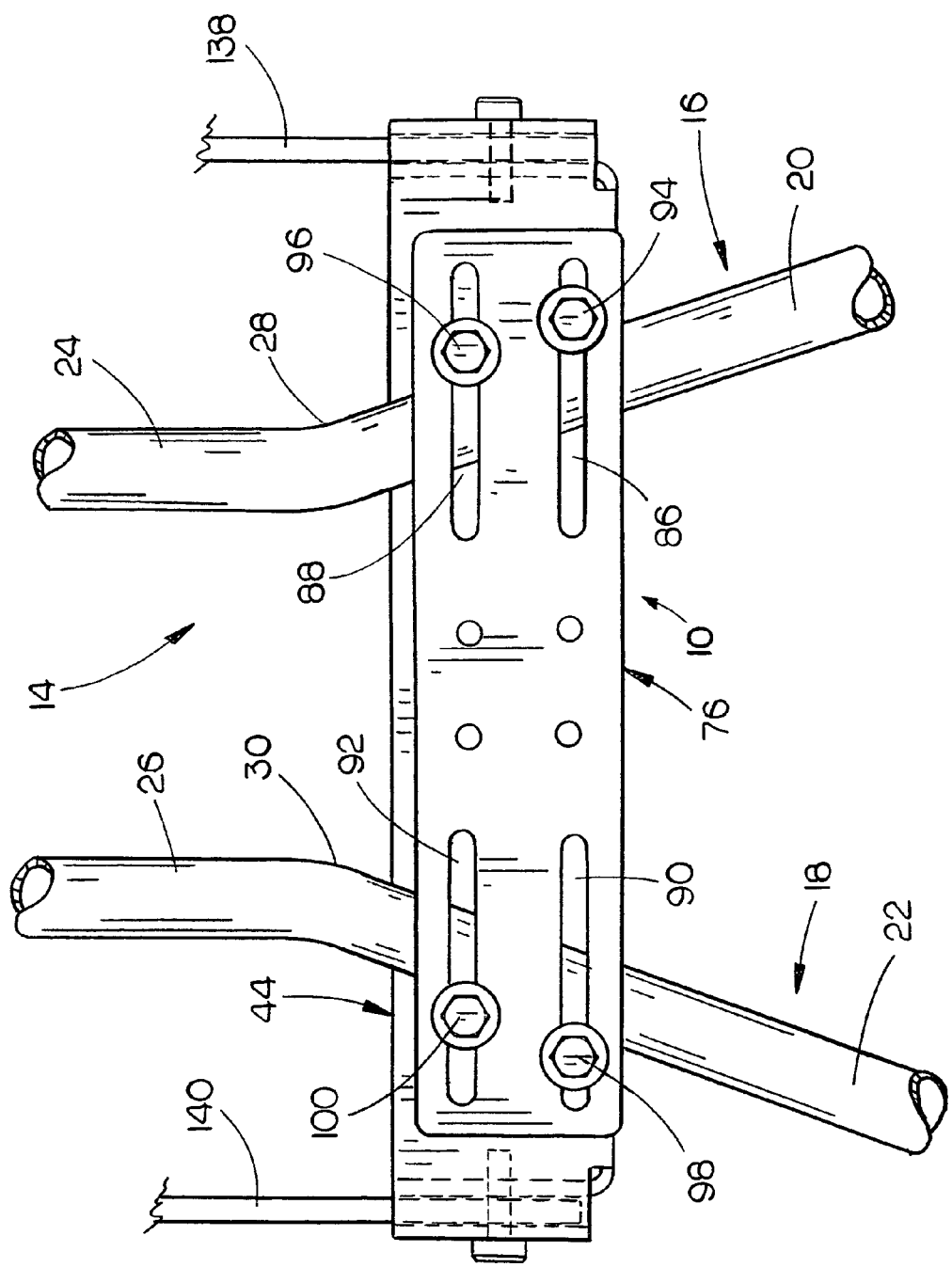
FIG. 7 is a top elevational view illustrating the manner in which the forward mount of this invention may be secured to the frame members of the frame of the off-road vehicle.

A second way of securing the forward mount 10 to the frame 14 is illustrated in FIG. 7. In this case, the main frame 14 does not have the frame members 40 and 42, or if it does, frame members 40 and 42 are not utilized. The forward mount weldment 44 is positioned below the frame members 16 and 18 adjacent the junctures 28 and 30 and slightly rearwardly thereof. Top plate 76 is then positioned on frame members 16 and 18. Bolts 94 and 96 with washers 120 thereon are then extended downwardly through slots 86 and 88 in top plate 76 and extended downwardly through slots 68 and 70 in plate 58 of forward mount weldment 44. Washers 120 and nuts 118 are placed on the lower ends of bolts 94 and 96. Bolts 98 and 100 with washers 120 thereon are then extended downwardly through slots 90 and 92 in top plate 76 and extended downwardly through slots 72 and 74 in plate 58 of forward mount weldment 44. Washers 120 are placed on the lower ends of bolts 98 and 100 and nuts 118 are threaded onto the bolts 98 and 100. It is preferred that the bolts 94 and 96 have spacers 106 and 108 thereon respectively between top plate 76 and plate 58 to prevent bending of top plate 76. It is also preferred that the bolts 98 and 100 have spacers 110 and 112 thereon respectively between top plate 76 and plate 58 to prevent bending of top plate 76. Bolts 102 and 104 may be extended downwardly through spacers 114 and 116 respectively and through slots 70 and 74 in plate 58 respectively with washers 120 and nuts 118 placed on the lower ends thereof. The bolts 102 and 104 with the spacers 114 and 116 thereon respectively support the central portion of top plate 76. It is preferred that the bolts 94 and 96 are positioned in slots 86 and 88 as shown in FIG. 7, and that the bolts 98 and 100 are positioned in slots 90 and 92 as shown in FIG. 7 to firmly secure the forward mount 10 to the main frame 14. The bolts 94 and 96 should be closely positioned adjacent the outer side of frame portion 20 of frame member 16 and bolts 98 and 100 should be closely positioned adjacent the outer side of frame portion 22 of frame member 18. The positioning of the bolts 94, 96, 98 and 100 as described above aid in preventing rearward movement of forward mount 10 should the implement 136 strike an obstruction.

Figure 7A:
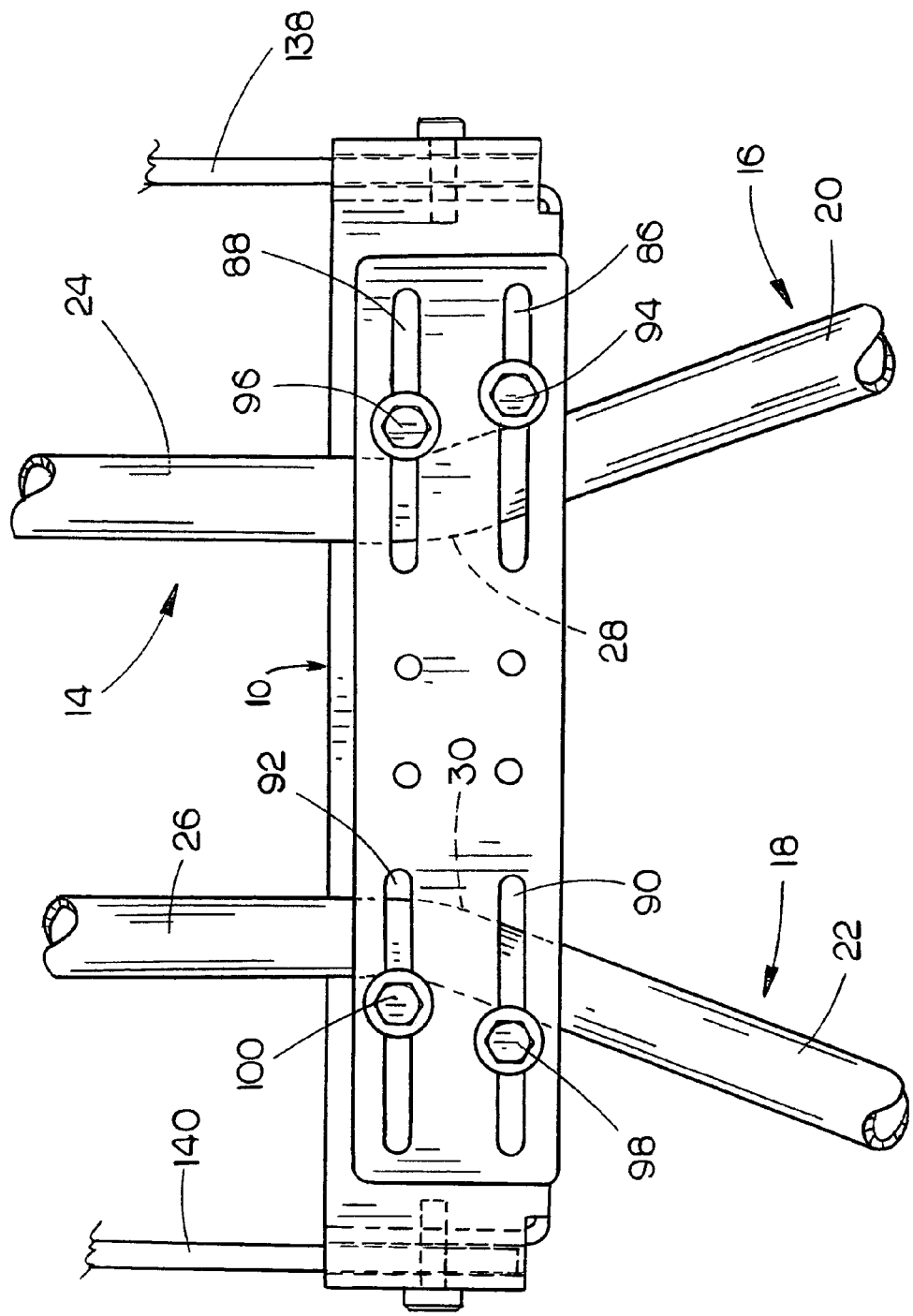
FIG. 7A is a view similar to FIG. 7 except that the forward mount is shown secured to the frame members of the frame of the off-road vehicle in a position forwardly of that shown in FIG. 7.
Figure 8:
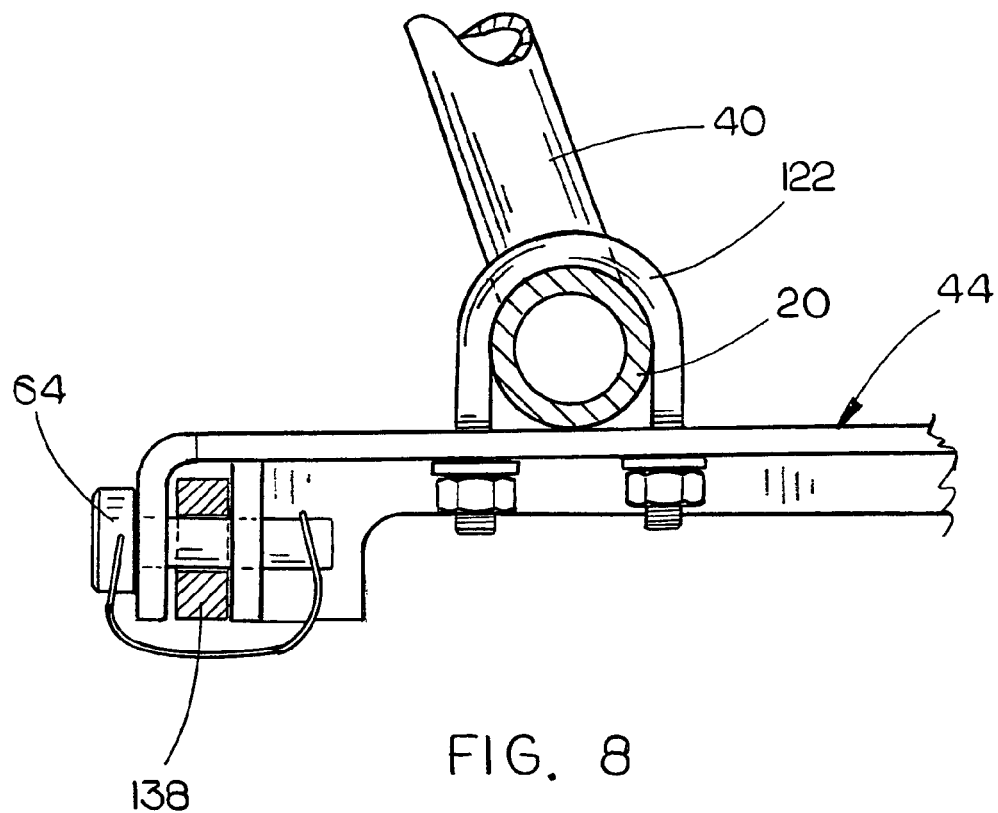
FIG. 8 is a partial sectional view illustrating the manner in which the forward mount weldment may be attached to the frame of the off-road vehicle.
Figure 9:
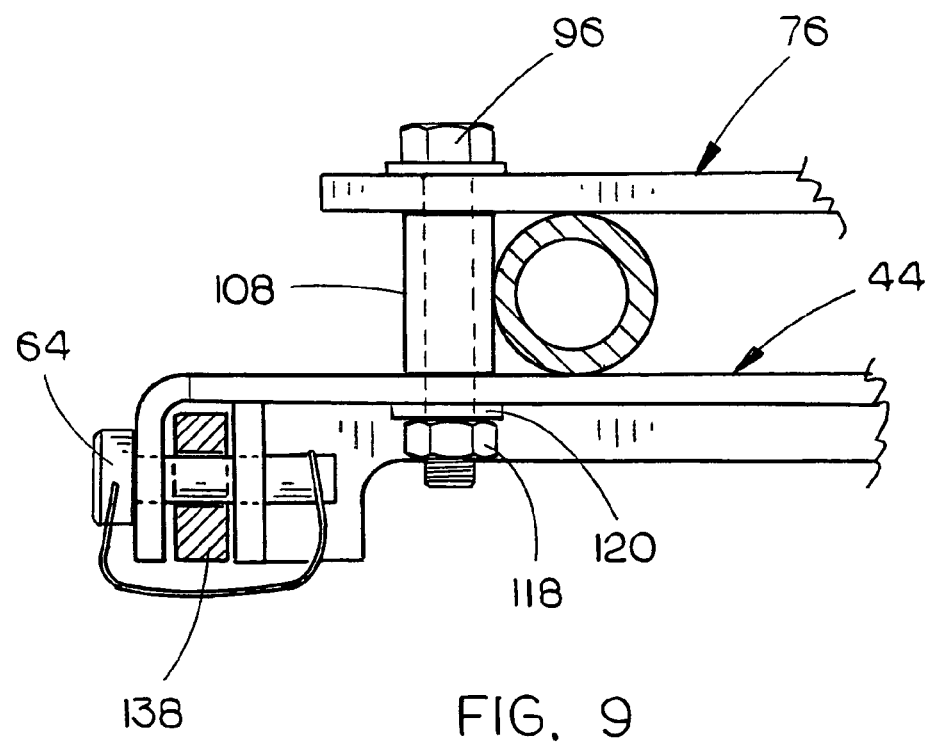
FIG. 9 is a view similar to FIG. 8 except that it shows the forward mount being attached to the frame of the off-road vehicle in a different manner.

A third method of securing the forward mount 10 to the frame of the ATV 12 is shown in FIG. 7A. The mounting method of FIG. 7A is the same as in FIG. 7 except that the forward mount 10 has been moved forwardly with respect to frame members 16 and 18 so that the bolts 96 and 100 are positioned at the junctures 28 and 30 respectively.

A fourth method of securing the forward mount 10 to the frame of the ATV 12 is shown in FIG. 7B. The mounting method of FIG. 7B is the same as in FIG. 7A except that the forward mount 10 has been moved forwardly with respect to frame members 16 and 18 so that the forward mount 10 is positioned forwardly of the junctures 28 and 30. The method of FIG. 7B permits the forward mount 10 to be positioned closer to the forward end of the ATV 12 so that the implement 136 on the forward end of the push tube assembly 134 is positioned further forwardly of the forward end of the ATV 12 which will enable the implement 136 to be pivotally moved higher than usual. The positioning of the bolts 94 and 98 adjacent the junctures 28 and 30 respectively also serve to limit the rearward movement of forward mount 10 should the implement 136 strike and obstruction.

In each of the mounting methods described above, the slots in the forward mount weldment 44 and the top plate 76 enable the forward mount 10 to be secured to the frames of different manufacturers which may have different spacings of the frame members 16 and 18.

Figure 10:
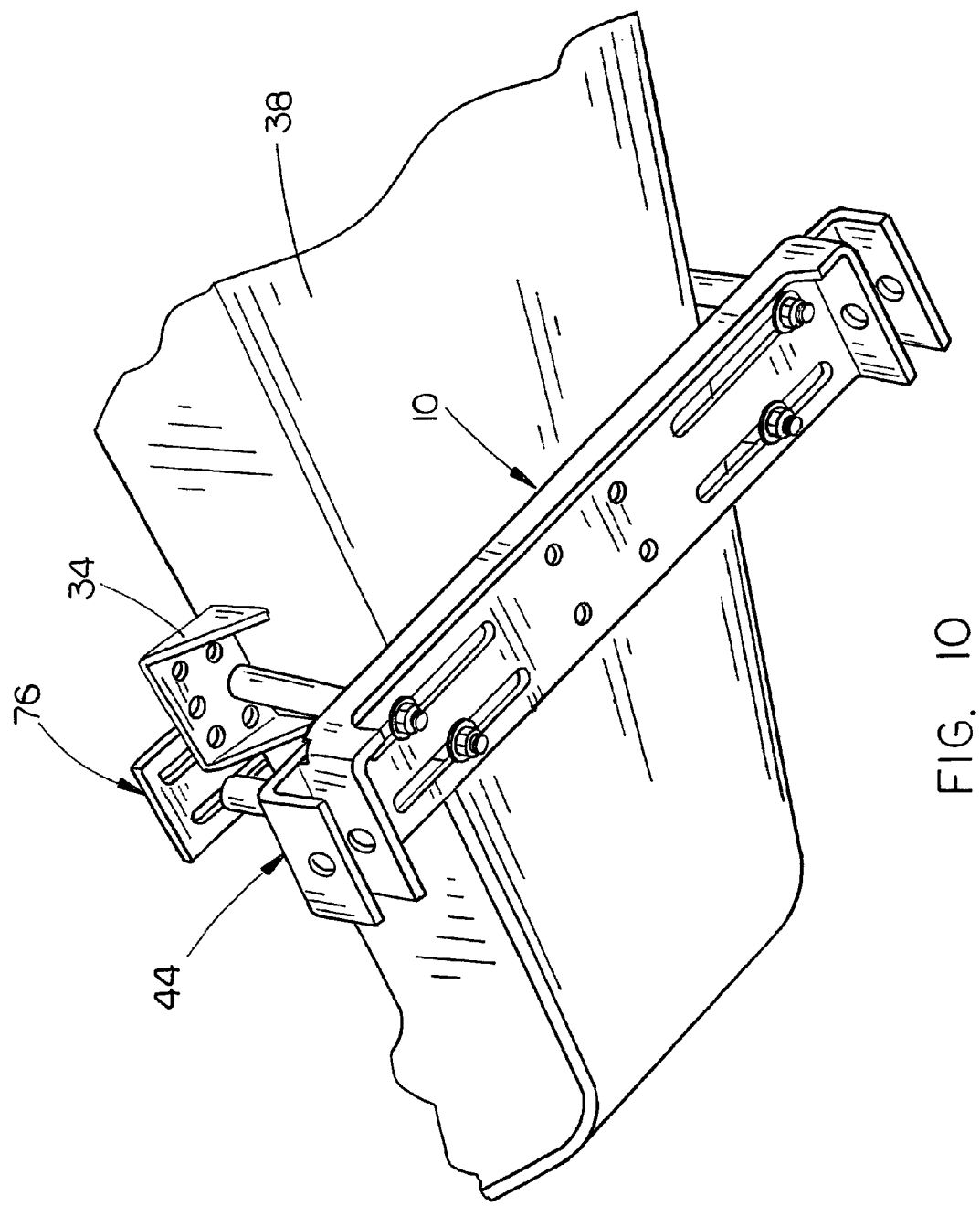
FIG. 10 is a bottom perspective view illustrating another manner in which the forward mount of this invention may be secured to the frame of an off-road vehicle.

A fifth method of securing the forward mount 10 to the ATV 12, as shown in FIG. 10, will now be described. In those ATV's which have the longitudinally extending frame member 38 and the mounts 34 extending therefrom, the forward mount weldment 44 is centrally positioned below frame member 38 and the top plate 76 is positioned above frame member 38. A bolt with a spacer thereon is extended downwardly through slot 86 in top plate 76 and is extended downwardly through slot 68 in plate 58. A washer and nut are mounted in the lower end of the bolt. A second bolt with a spacer thereon is extended downwardly through slot 88, through a hole in mount 34 and through slot 70 in plate 58. A washer and nut are mounted on the lower end of that bolt. The other end of forward mount 10 is similarly positioned.

Thus it can be seen that a unique forward mount has been provided which enables it to be secured to the main frame of an off-road vehicle near the front end thereof. The forward mount of this invention can be attached to the main frames of various off-road vehicles due to the forward mount weldment 44 having the transversely extending slots formed therein and due to the fact that when the top plate 76 is utilized, it also has the transversely extending slots formed therein. If the vehicle has a skid plate thereon which partially covers the underside of the main frame of the off-road vehicle, portions of the skid plate may be trimmed or cut off to expose the frame members of the main frame thereof.

The unique way of securing the forward mount of this invention to the main frame not only permits the forward mount to be attached to the frames of various manufacturers but also prevents the rearward movement of the forward mount with respect to the main frame of the vehicle should the implement on the front end of the vehicle strike an obstruction.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
    an off-road vehicle having a forward end, a rearward end, and an underside;
    said vehicle including a main frame having a portion thereof exposed at the underside thereof;
    said main frame including a first longitudinally extending frame member, having a generally longitudinally extending rear frame portion, having forward and rearward ends, an intermediate frame portion, having rearward and forward ends, which extends horizontally forwardly and inwardly from the forward end of said rear frame portion, and a generally longitudinally extending front frame portion, with rearward and forward ends, which extends forwardly from said forward end of said intermediate frame portion;
    said main frame also including a second longitudinally extending frame member having a generally longitudinally extending rear frame portion, with forward and rearward ends, an intermediate frame portion, having rearward and forward ends, which extends horizontally forwardly and inwardly from the forward end of said rear frame portion, and a generally longitudinally extending front frame portion, with rearward and forward ends, which extends forwardly from said forward end of said intermediate frame portion;
    said rear frame portions of said first and second frame members being generally parallel to one another;
    said front frame portions of said first and second frame members being generally parallel to one another;
    and an elongated forward mount, having first and second ends, selectively detachably secured to said first and second frame members and extending therebetween;
    said forward mount having a push tube mount at each of its ends for pivotally receiving rearward ends of a push tube assembly.

2. The combination of claim 1 wherein said forward mount is detachably secured to said first and second frame members and extends therebetween adjacent the juncture of said front and intermediate frame positions thereof.

3. The combination of claim 1 wherein said forward mount is detachably secured to said first and second frame members and extends therebetween rearwardly of the juncture of said front and intermediate frame portions thereof.

4. The combination of claim 1 wherein said forward mount is detachably secured to said first and second frame members and extends therebetween forwardly of said forward ends of the intermediate frame portions thereof.

5. The combination of claim 1 wherein said forward mount is secured to said first and second frame members by U-bolts.

6. The combination of claim 1 wherein said forward mount includes a mounting plate which is positioned below said first and second frame members.

7. The combination of claim 6 wherein said mounting plate is secured to said first and second frame members by U-bolts.

8. The combination of claim 6 wherein said mounting plate includes a plurality of spaced-apart transversely extending slots formed therein.

9. The combination of claim 6 wherein said forward mount includes a top plate, having a plurality of spaced-apart transversely extending slots formed therein, which is positioned above said first and second frame members and wherein bolts interconnect said mounting plate and said top plate by extending through said slots therein.

10. The combination of claim 9 wherein each of said mounting plate and said top plate has a plurality of spaced-apart and transversely extending slots formed therein.

11. The combination of claim 9 wherein a plurality of spacers are positioned between said mounting plate and said top plate.

\* \* \* \* \*